United States Patent
Chung et al.

(10) Patent No.: US 10,198,650 B2
(45) Date of Patent: Feb. 5, 2019

(54) IMAGE CAPTURE APPARATUS

(71) Applicant: Gingy Technology Inc., Hsinchu (TW)

(72) Inventors: Wei-Chun Chung, Hsinchu (TW); Jen-Chieh Wu, Hsinchu (TW)

(73) Assignee: GINGY TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/008,990

(22) Filed: Jun. 14, 2018

(65) Prior Publication Data

US 2018/0293452 A1 Oct. 11, 2018

Related U.S. Application Data

(63) Continuation-in-part of application No. 15/942,386, filed on Mar. 30, 2018, and a continuation-in-part of (Continued)

(30) Foreign Application Priority Data

Jul. 18, 2016 (TW) .............................. 105122567 A
May 24, 2018 (CN) ..................... 2018 2 0778693 U

(51) Int. Cl.
*G06K 9/00* (2006.01)
*G06K 9/20* (2006.01)
(Continued)

(52) U.S. Cl.
CPC ......... *G06K 9/3216* (2013.01); *G06K 9/0004* (2013.01); *G06K 9/00255* (2013.01);
(Continued)

(58) Field of Classification Search
CPC ............... G06K 9/0004; G06K 9/3216; G06K 9/00255; G06K 9/2027; G06K 9/209; H04N 5/2254; G02B 27/30
See application file for complete search history.

(56) References Cited

U.S. PATENT DOCUMENTS 5,177,802 A 1/1993 Fujimoto et al.
9,818,017 B2 11/2017 Wu
(Continued)

FOREIGN PATENT DOCUMENTS

CN 104849870 A 8/2015
JP 2003-141514 A 5/2003
(Continued)

*Primary Examiner* — Michael Pervan
(74) *Attorney, Agent, or Firm* — Li & Cai Intellectual Property (USA) Office

(57) ABSTRACT

An image capture apparatus is provided. The image capture apparatus includes a transparent cover, an image capture device, and a luminous flux adjusting device disposed therebetween. The image capture device includes a plurality of sensor regions, each of which has a maximum length in a first direction and a maximum width in a second direction. The luminous flux adjusting device includes a absorbing element having a transparent pattern including a plurality of repeatedly arranged basic patterns. Each of the basic patterns includes a plurality of transparent regions arranged according to a geometric shape. The geometric shape has a side parallel to the first direction, and a length of the side is less than or equal to the maximum length of the sensor region. The geometric shape has a height in the second direction less than or equal to the maximum width of the sensor region.

24 Claims, 13 Drawing Sheets

Related U.S. Application Data application No. 15/239,842, filed on Aug. 18, 2016, now Pat. No. 10,049,256.

(60) Provisional application No. 62/613,419, filed on Jan. 4, 2018, provisional application No. 62/574,222, filed on Oct. 19, 2017, provisional application No. 62/266,002, filed on Dec. 11, 2015.

(51) Int. Cl.
*G06K 9/32* (2006.01)
*H04N 5/225* (2006.01)

(52) U.S. Cl.
CPC ........... *G06K 9/209* (2013.01); *G06K 9/2027* (2013.01); *H04N 5/2254* (2013.01)

(56) References Cited

U.S. PATENT DOCUMENTS

| | | |
|---|---|---|
| 9,964,436 B1 | 5/2018 | Chung et al. |
| 2010/0208952 A1 | 8/2010 | Wu |
| 2016/0132712 A1 | 5/2016 | Yang et al. |
| 2016/0224816 A1 | 8/2016 | Smith et al. |
| 2017/0212358 A1 | 7/2017 | Fan et al. |

FOREIGN PATENT DOCUMENTS

| | | |
|---|---|---|
| TW | 201032146 A1 | 9/2010 |
| TW | 201310299 A1 | 3/2013 |

IMAGE CAPTURE APPARATUS

CROSS-REFERENCE TO RELATED PATENT APPLICATION

This application is a continuation-in-part application of and claims the priority benefit of a prior application Ser. No. 15/239,842, filed on Aug. 18, 2016, now allowed, which claims the priority benefits of U.S. provisional application Ser. No. 62/266,002, filed on Dec. 11, 2015, and Taiwan application serial no. 105122567, filed on Jul. 18, 2016. This application is also a continuation-in-part application of and claims the priority benefit of a prior application Ser. No. 15/942,386, filed on Mar. 30, 2018, now pending, which claims the priority benefits of U.S. provisional application Ser. No. 62/613,419, filed on Jan. 4, 2018, U.S. provisional application Ser. No. 62/574,222, filed on Oct. 19, 2017, and claims the priority benefit of a China application serial no. CN201820778693.0 filed on May 24, 2018. The entirety of each of the above patent applications is hereby incorporated by reference herein and made a part of this specification.

FIELD OF THE DISCLOSURE

The present disclosure relates to an electronic apparatus, particularly an image capture apparatus.

BACKGROUND OF THE DISCLOSURE

A conventional optical biometric system can be used to detect and recognize faces, voices, irises, retinas or fingerprints. For example, in an optical fingerprint recognition system, a conventional image capture apparatus includes at least a luminous element, a transparent element and an image sensor, wherein the transparent element is disposed upon the image sensor.

After being generated by the luminous element and transmitted to the transparent element, a light beam is totally reflected at an interface between the transparent element and an environmental medium and is transmitted to the image sensor. When users put their fingers on the transparent element, fingerprint patterns captured by the image sensor have dark and light stripes, respectively corresponding to ridges and valleys. Then, an image processing apparatus processes the fingerprint patterns captured by the image sensor and the users' identities can further be determined.

In prior art, the image sensor includes a plurality of pixel areas, respectively receiving light beams respectively reflected by different areas of the transparent element. In order to prevent the pixel areas from receiving stray light to interfere with imaging quality when an intense environmental beam (e.g., solar radiation) radiates, the conventional image capture apparatus further includes a light limiting element disposed between the transparent element and the image sensor. Specifically, FIG. 1A is a partial top view of the conventional light limiting element disposed on the image sensor. In ideal circumstances, a light limiting element 12 has a plurality of openings respectively aligned with a plurality of pixel areas 110 to limit an amount of incident light of each of the pixel areas 110.

However, alignment accuracy between the light limiting element 12 and an image sensor 11 may be more demanding. FIG. 1B is a partial top view of the conventional light limiting element 12 disposed on the image sensor 11. If the alignment between the light limiting element 12 and the image sensor 11 is inaccurate, an opening 120 of the light limiting element 12 will be deviated relative to the corresponding pixel area 110. That is to say, the opening 120 of the light limiting element 12 and the corresponding pixel area 110 can partially overlap merely in a vertical direction and cannot completely overlap. Therefore, a light beam passing through the opening 120 cannot be completely received by the corresponding pixel area 110, such that an overall amount of incident light of the image sensor 11 will greatly reduce and the imaging quality will be affected.

SUMMARY OF THE DISCLOSURE

The present disclosure is to provide an image capture apparatus regarding the problems of the conventional image capture apparatus, to prevent alignment deviation from affecting imaging quality.

In order to solve the above technical issue, one of exemplary embodiment of the present disclosure is to provide an image capture apparatus, including: a transparent cover, an image capture device and a luminous flux adjusting device. The transparent cover has a surface in contact with an environmental medium. The image capture device is disposed at a side of the transparent cover opposite to the surface, wherein the image capture device includes a plurality of sensor regions, each of which has a maximum length in a first direction and a maximum width in a second direction. The luminous flux adjusting device is between the transparent cover and the image capture device and includes at least one absorbing element having a transparent pattern. The transparent pattern includes a plurality of basic patterns repeatedly arranged, each of the basic patterns includes a plurality of transparent regions arranged according to a geometric shape, the geometric shape has a side parallel to the first direction, and the length of the side is less than or equal to the maximum length of the sensor region, and the geometric shape has a height vertical to the side and less than or equal to the maximum width of the sensor region.

Another exemplary embodiment of the present disclosure is to provide an image capture apparatus, including: a transparent cover, an image capture device and a luminous flux adjusting device. The transparent cover has a surface in contact with an environmental medium. The image capture device is disposed at a side of the transparent cover with respect to the surface, wherein the image capture device includes a plurality of sensor regions, each of which has a maximum length in a first direction and a maximum width in a second direction. The luminous flux adjusting device is between the transparent cover and the image capture device and includes at least one absorbing element having a transparent pattern. The transparent pattern includes a plurality of basic patterns repeatedly arranged, each of the basic patterns includes a plurality of transparent regions arranged according to a hexagon shape, one of the transparent regions is located at a center position of the hexagon, and the other transparent regions are respectively located at six vertexes of the hexagon. A distance between the center position and any of the vertexes of the hexagon is less than or equal to the maximum length of the sensor region, and a distance between the center position and one of the sides of the hexagon is less than or equal to the maximum width of the sensor region.

Another exemplary embodiment of the present disclosure is to provide an image capture apparatus, including: a transparent cover, an image capture device and a luminous flux adjusting device. The transparent cover has a surface in contact with an environmental medium. The image capture device is disposed at a side of the transparent cover with respect to the surface, wherein the image capture device includes a plurality of sensor regions, each of which has a maximum length in a first direction and a maximum width in a second direction. The luminous flux adjusting device is between the transparent cover and the image capture device and includes at least one absorbing element having a transparent pattern. The transparent pattern includes a plurality of transparent regions arranged along a plurality of X-axes and a plurality of Y-axes, and the plurality of the X-axes and the plurality of the Y-axes intersect each other at a plurality of intersection points. The plurality of the transparent regions are located at least a part of the plurality of the intersection points. A distance between two intersection points, at which two adjacent transparent regions being arranged on the same Y-axis are respectively positioned, is less than or equal to the maximum length of the sensor region. A distance between two adjacent Y-axes is less than or equal to the maximum width of the sensor region.

One of the advantages of the present disclosure lies in that, with technical features of the absorbing element having the transparent pattern formed by the plurality of the basic patterns repeatedly arranged, it may prevent the issue that the amount of incident light greatly reduces due to a change of a relative position of the luminous flux adjusting device and the image capture device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1A:
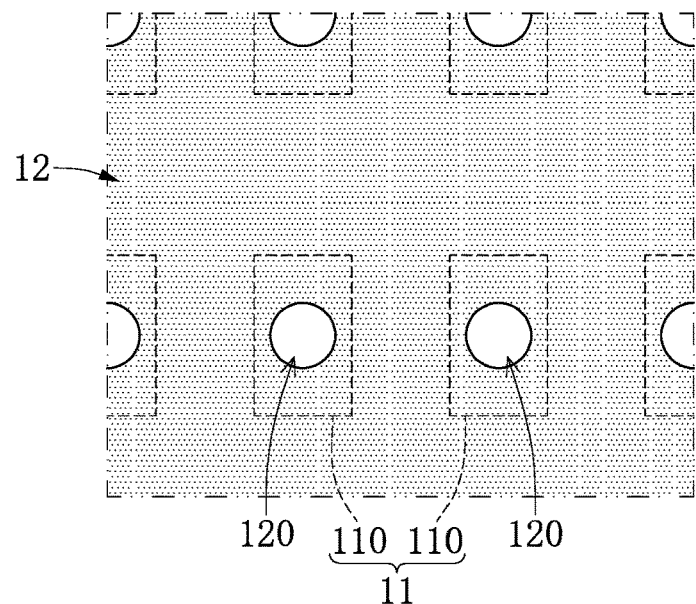
FIG. 1A is a partial top view of a conventional light limiting element disposed on an image sensor.
Figure 1B:
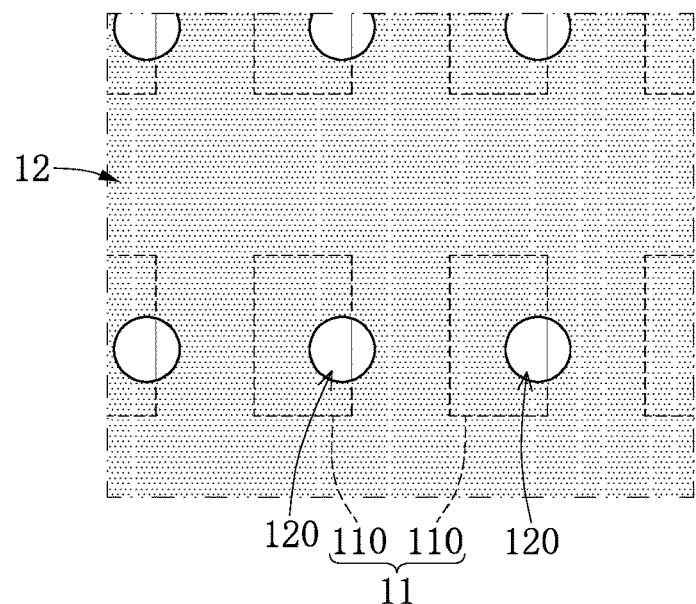
FIG. 1B is a partial top view of the conventional light limiting element disposed on the image sensor.

The present disclosure is more particularly described in the following examples that are intended as illustrative only since numerous modifications and variations therein will be apparent to those skilled in the art. Various embodiments of the disclosure are now described in detail. Referring to the drawings, e.g., reference numbers, if any, indicate such as components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

While numbering terms such as "first", "second" or "third" may be used in this disclosure to describe various components, signal or the like, the terms are for distinguishing one component from another component, or one signal from another signal only, and are not intended to, nor should they be construed to impose any other substantive descriptive limitations on the components, signals or the like.

Figure 2:
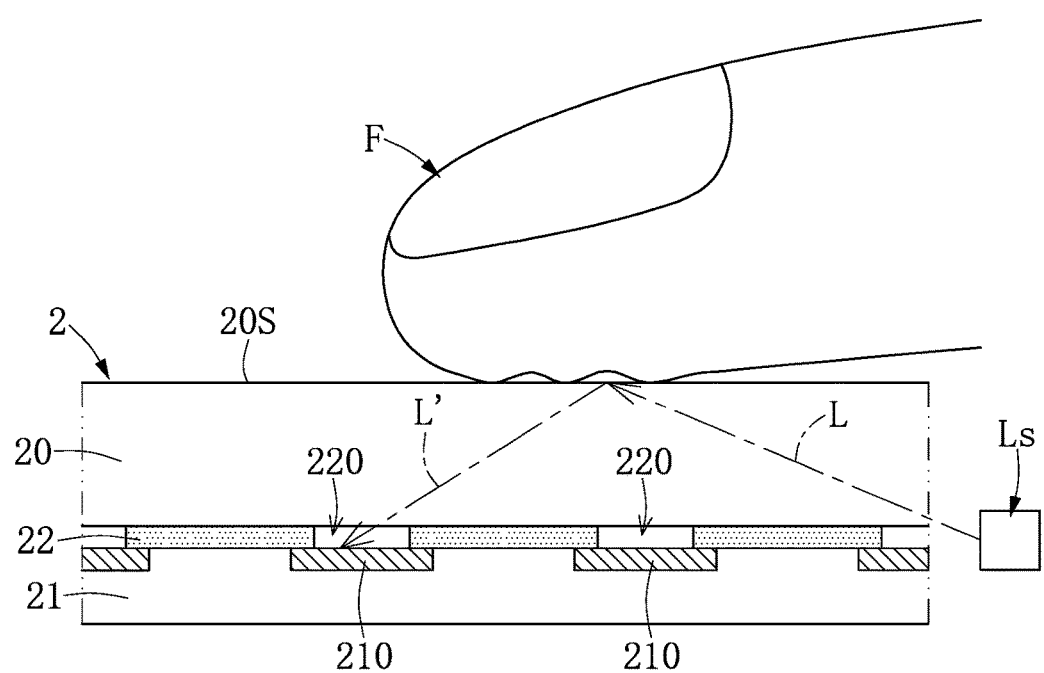
FIG. 2 is a partial sectional view of an image capture apparatus according to an embodiment of the present disclosure.

FIG. 2 is a partial sectional view of an image capture apparatus according to an embodiment of the present disclosure. One of the embodiments of the present disclosure provides an image capture apparatus 2. The image capture apparatus 2 can be applied to an electronic apparatus to capture an image of an object F to recognize. The aforementioned electronic apparatus can be a biometric device, for example, a fingerprint recognition device, a palm print recognition device, an eye tracking device and so on.

The image capture apparatus 2 is used in an environmental medium, such as in the air, water, or other environmental media. The aforementioned object F is, for example, a finger, a palm, a wrist or an eyeball of users, and the image captured by the image capture apparatus 2 is, for example, a fingerprint image, a palm print image, a vein image, a pupil image, or an iris image, but the present disclosure is not limited thereto.

Referring to FIG. 2, the image capture apparatus 2 according to one of the embodiments of the present disclosure includes a transparent cover 20, an image capture device 21 and a luminous flux adjusting device 22, wherein the luminous flux adjusting device 22 is disposed between the transparent cover 20 and the image capture device 21.

Specifically, the transparent cover 20 has a surface 20S in contact with an environmental medium. When the image capture apparatus 2 is applied to an optical fingerprint recognition system to capture a fingerprint image and/or a vein image, the surface 20S of the transparent cover 20 can be contacted or pressed by a finger to be detected and recognized.

In addition, a light beam L transmitted in the transparent cover 20 is reflected by the surface 20S to form a signal light beam L' projected to the luminous flux adjusting device 22. In this embodiment, the aforementioned light beam L may be generated by a luminous element Ls, e.g., a light emitting diode or the like, and may be applied to recognize biometric features. In this embodiment, the light emitting diode Ls is disposed beside the image capture device 21 and near a sensor region 210. Further, the luminous element Ls and the image capture device 21 are located at the same side of the transparent cover 20 (for example, both are located below the transparent cover 20). Furthermore, the image capture apparatus 2 may also include a plurality of the luminous elements Ls, respectively disposed at different sides of the image capture device 21. For instance, the plurality of the luminous elements Ls may be dispersedly disposed around the image capture device 21.

In the other embodiments, the light beam L generated by the luminous element Ls may also be guided to the transparent cover 20 by a light guide device or a reflecting device. Therefore, as long as the light beam L generated by the luminous element Ls can be projected to the surface 20S of the transparent cover 20, the present disclosure does not limit a position of the luminous element Ls.

However, in the other embodiments, the luminous element Ls may be omitted. When the luminous element Ls is omitted, the light beam L may be ambient light incident into the transparent cover 20. In another embodiment, when the image capture apparatus 2 includes a display panel or applies the transparent cover 20 to serve as a display panel, the light beam L used to recognize the fingerprint may be provided by the display panel. The light beam L may be visible light, infrared light or other monochromatic light, which is not limited thereto.

A material of the transparent cover 20 may be selected from the group consisting of glass, polymethymethacrylate (PMMA) or polycarbonate (PC) or other proper materials. Moreover, the transparent cover 20 may be disposed on the luminous flux adjusting device 22 by choosing a suitable optical cement (not shown in the drawings) or other fixing means. In any of the embodiments of the present disclosure, the transparent cover 20 may be a cover plate, a touch element, a display element, a translucent plate, a light guide plate or a combination thereof, which is not limited thereto.

In an exemplary embodiment of the present disclosure, the transparent cover 20 may be a TFT display panel or an organic light emitting diode (OLED) display panel or an OLED display panel having a touch layer. As mentioned before, the light beam generated during the operation of the display panel can serve as a light source for capturing a fingerprint image. A structure of the display panel can refer to a relevant part of an U.S. provisional application Ser. No. 62/533,632 entitled "BIOMETRIC APPARATUS" filed by the Applicant. It should be understood that the OLED display panel having the touch layer has a protective layer formed on an outer surface thereof, and the present disclosure does not limit that the display panel is a rigid or flexible panel, which should be stated at the outset.

The image capture device 21 is disposed at a side of the transparent cover 20 and has a plurality of the sensor regions 210 facing the transparent cover 20 to receive the signal light beam L' passing through the luminous flux adjusting device 22. The image capture device 21 receives the signal light beam L' and then converts the signal light beam L' to an electric signal. In other words, the image capture device 21 is a photoelectric transducer element, such as a charge coupled device (CCD) or a complementary metal-oxide semiconductor (CMOS). However, in another embodiment, other image sensor can be used to the image capture device 21.

When the object F (i.e., a finger) contacts the surface 20S of the transparent device 20, the lines of the finger contact the surface 20S and the light beam L projected to the surface 20 would be reflected to form the signal light beam L'. The signal light beam L' passes through the luminous flux adjusting device 22 and then is received by the plurality of the sensor regions 210 of the image capture device 21. Then, an image processing element performs an image processing on the signal light beam L' received by the plurality of the sensor regions 210 in different positions to obtain a bright and dark fingerprint image.

Referring to FIG. 2, in this exemplary embodiment, the luminous flux adjusting device 22 disposed between the transparent cover 20 and the image capture device 21 includes at least one absorbing element, and the absorbing element has a transparent pattern (not labeled). The signal light beam L' is projected from the surface 20S to the luminous flux adjusting device 22, passes through a plurality of the transparent patterns and is received by the plurality of the sensor regions 210.

In this exemplary embodiment, the absorbing element is made of a material absorbing light, such as dark glass, plastic or a photoresist. The absorbing element has a plurality of open holes to form the transparent patterns. In other embodiments, the transparent patterns may also be formed by filling transparent materials in each open hole of the absorbing element. In other embodiments, the luminous flux adjusting device 22 may also include a transparent element and an absorbing element, and the absorbing element is a black ink layer with transparent patterns.

Figure 3A:
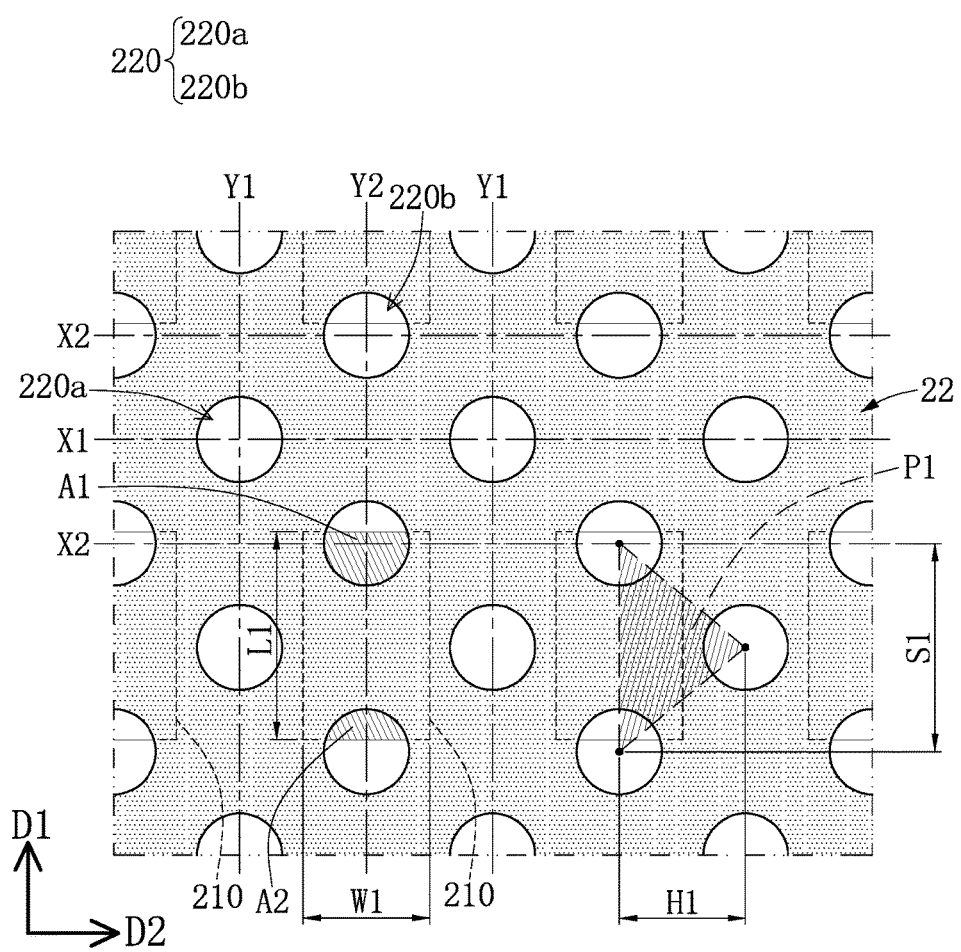
FIG. 3A is a partial top view of a luminous flux adjusting device and an image capture device of the image capture apparatus of FIG. 2 in a relative position.

FIG. 3A is a partial top view of the luminous flux adjusting device and the image capture device of the image capture apparatus of FIG. 2. It should be stated that each sensor regions 210 may include one or a plurality of pixels, and each sensor region 210 has a maximum length L1 in a first direction D1, and a maximum width W1 in a second direction D2. In this embodiment, a shape from top view of the sensor region 210 is a rectangle. However, in other embodiments, the shape from top view of the sensor region 210 may also be a circle, a square, a parallelogram, a hexagon or other geometric shapes, which is not limited thereto.

Further, in this embodiment, the absorbing element 22a having specific transparent patterns can prevent a reduction in an amount of incident light of the image capture device 21 due to a change of a relative position of the luminous flux adjusting device 22 and the image capture device 21.

Specifically, in FIG. 3A, the transparent patterns of the absorbing element 22a include a plurality of basic patterns repeatedly arranged, and each of the basic patterns includes a plurality of transparent regions 220 disposed according to a geometric shape P1. The geometric shape P1 has a side parallel to the first direction D1, and a length S1 of the side is less than or equal to the maximum length L1 of the sensor region 210. In addition, the geometric shape P1 has a height H1 vertical to the side and less than or equal to the maximum width W1 of the sensor region 210.

Further, the length S1 of the side and the maximum length L1 of the sensor region 210 satisfy the following relation: n1×S1=L1, where n1 is a positive integer, S1 is the length of the side, and L1 is the maximum length of the sensor region 210. The height H1 and the maximum width W1 of the sensor region 210 satisfy the following relation: n2×H1=W1, where n2 is a positive integer, H1 is the height of the geometric shape P1, and W1 is the maximum width of the sensor region 210.

In this exemplary embodiment, the geometric shape P1 is a triangle, for example, an isosceles triangle, a right triangle, or an equilateral triangle. In addition, each of the basic patterns includes three transparent regions 220 respectively located at three vertexes of the triangle. In FIG. 3A, one of the sides of the triangle is substantially parallel to the first direction D1 and the height H1 of the triangle is a shortest distance from the vertex to the side parallel to the first direction D1.

Figure 3B:
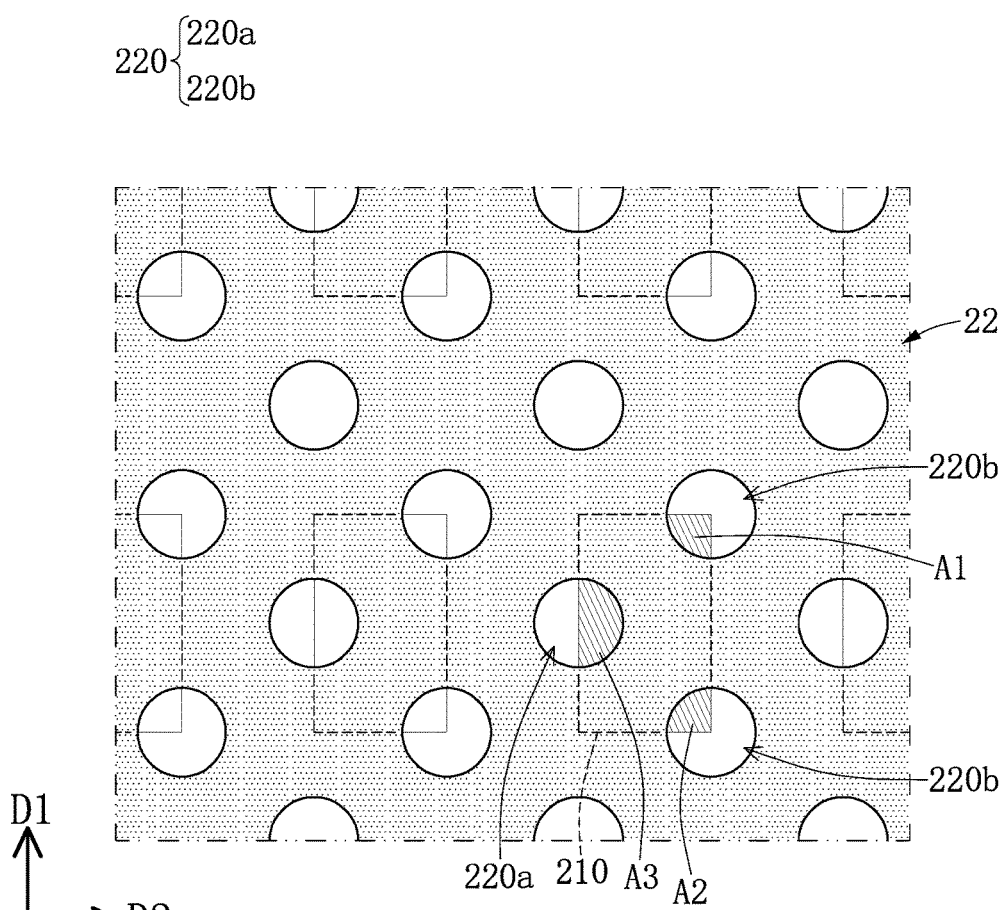
FIG. 3B is a partial top view of the luminous flux adjusting device and the image capture device of the image capture apparatus of FIG. 2.
Figure 3C:
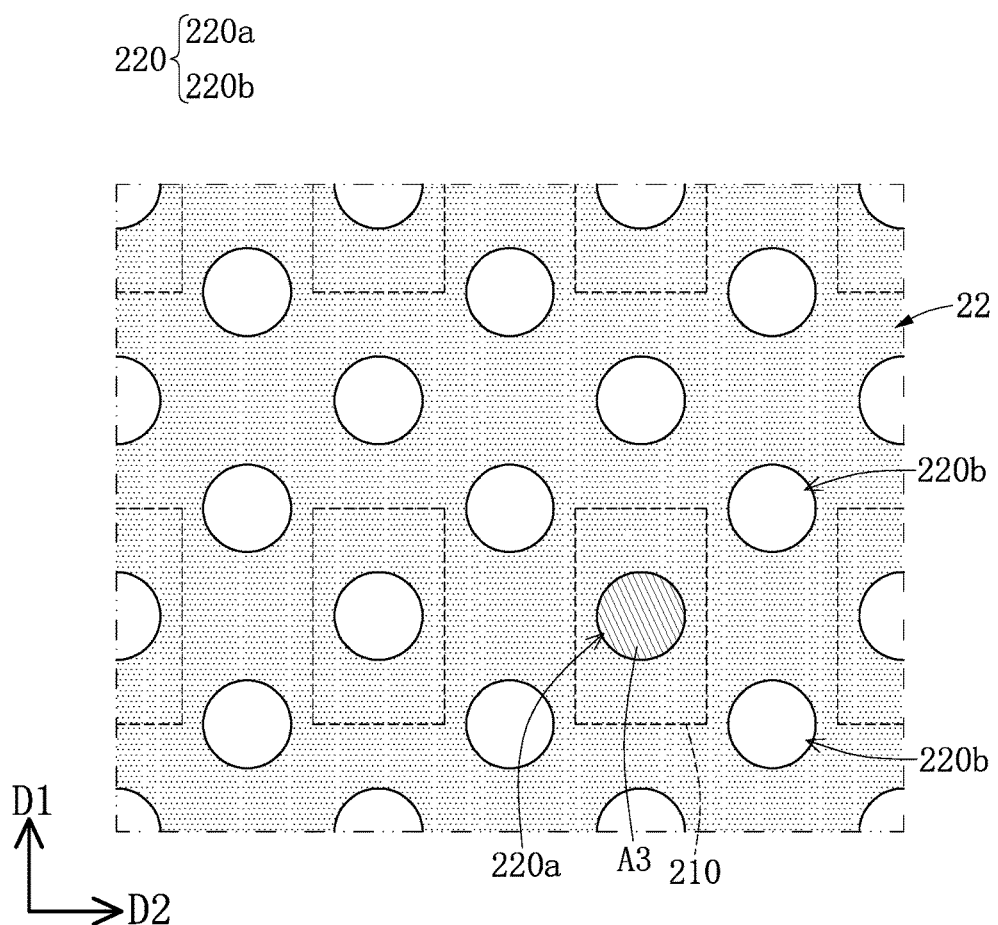
FIG. 3C is a partial top view of the luminous flux adjusting device and the image capture device of FIG. 2.

FIG. 3A to FIG. 3C respectively show a change of a relative position between the plurality of the transparent regions 220 and the plurality of the sensor regions 210 when the absorbing element 22a and the image capture device 21 are arranged in different relative positions.

In FIG. 3A, one of the sensor regions 210 and two of the transparent regions 220 would overlap each other in a vertical direction (namely, in a normal direction of the sensor region 210). A vertical projection region of one of the transparent regions 220 overlaps the sensor region 210 at a first region A1, and another vertical projection region of the transparent regions 220 overlaps the sensor region 210 at a second region A2.

Referring to FIG. 3B again, when the absorbing element 22a is deviated relative to the image capture element 21, any of the sensor regions 210 would overlap three of the transparent regions 220 in the vertical direction. In FIG. 3B, vertical projection regions of the three transparent regions 220 respectively overlap the sensor region 210 at the first region A1, the second region A2 and a third region A3.

It should be noted that an overlap area between the vertical projection region of the transparent region 220 and the sensor region 210 positively correlates with an amount of incident light of the sensor region 210, and the smaller overlap area represents the fewer amount of incident light of the sensor region 210.

Here is a comparison between FIG. 3A and FIG. 3B. In FIG. 3B, due to the change of the relative position of the absorbing element 22a and the image capture device 21, the area of the first region A1 is half of the area of the first region A1 of FIG. 3A, and the area of the second region A2 is half of the area of the second region A2 of FIG. 3A. However, the area of the third region A3 in FIG. 3B can compensate for the amount of reduction of the areas of the first region A1 and the second region A2.

That is to say, a sum of the areas of the first region A1 and the second region A2 in FIG. 3A would substantially equal a sum of the areas of the first region A1, the second region A2 and the third region A3 in FIG. 3B, to prevent a large reduction in the amount of incident light of the sensor region 210 due to the change of the relative position between the absorbing element 22a and the image capture device 21.

Similarly, in FIG. 3C, the relative position of the absorbing element 22a and the image capture device 21 is changed, such that the sensor region 210 only overlaps a transparent region 220 in the vertical direction (namely, the normal direction of the sensor region 210). In FIG. 3C, the vertical projection region of the transparent region 220 overlaps the sensor region 210 at the third region A3.

Here is a comparison between FIG. 3B and FIG. 3C. It is understandable that the area (namely, the area of the transparent region 220) of the third region A3 in FIG. 3C is substantially equal to a sum of the areas of the first to the third regions A1 to A3 in FIG. 3B.

Based on the above, as long as the length S1 of the side of the geometric shape P1 parallel to the first direction D1 is less than or equal to the maximum length L1 of the sensor region 210 and the height H1 vertical to the side of the geometric shape is less than or equal to the maximum width W1 of the sensor region 210, no matter how the relative position of the absorbing element 22a and the image capture device 21 changes, any of the sensor regions 210 would overlap one or the plurality of the transparent regions 220 in the vertical direction, and the sums of the overlapping areas of the vertical projection region of the transparent region 220 and the sensor region will be substantially the same.

In this exemplary embodiment, six triangles can be arranged as a hexagon, at least one transparent region 220 would be located at a center position of the hexagon, and at least six transparent regions 220 would be located at six vertexes of the hexagon. It should be noted that the aforementioned hexagon is not necessary to be a regular hexagon.

From another point of view, the basic pattern may include the plurality of the transparent regions 220 arranged according to the hexagon. One of the transparent regions 220 is located at the center position of the hexagon and the other six transparent regions are respectively located at the six vertexes of the hexagon. Moreover, a distance (namely, S1) between the center position and any of the vertexes of the hexagon is less than or equal to the maximum length L1 of the sensor region 210. A distance (namely, the height H1) between the center position and one of the sides of the hexagon is less than or equal to the maximum width W1 of the sensor region 210.

In one exemplary embodiment, the hexagon is a regular hexagon, and as long as the distance between the center position and any of the vertexes of the hexagon is less than the maximum width of the sensor region 210, the purpose of the present disclosure can also be achieved.

Referring to FIG. 3A again, further, the transparent pattern may include the plurality of the transparent regions 220 arranged along a plurality of X-axes and a plurality of Y-axes. The plurality of the X-axes and the plurality of the Y-axes intersect each other and form a plurality of intersection points, and the plurality of the transparent regions 220 are respectively located at at least a part of the plurality of the intersection points.

In this embodiment, the plurality of the Y-axes are determined to extend along the first direction D1, and the plurality of the X-axes are determined to extend along the second direction D2. In addition, the plurality of the Y-axes are divided into a plurality of first Y-axes Y1 and a plurality of second Y-axes Y2, and the plurality of the first Y-axes Y1 and the plurality of the second Y-axes Y2 are alternately arranged. Furthermore, the plurality of the X-axes are also divided into a plurality of first X-axes X1 and a plurality of second X-axes X2, and the plurality of the first X-axes X1 and the plurality of the second X-axes X2 are alternately arranged.

In this embodiment, the distances between any two adjacent first X-axis X1 and second X-axis X2 are the same. The plurality of the transparent regions 220 are divided into a plurality of first transparent regions 220a and a plurality of second transparent regions 220b. The plurality of the first transparent regions 220a are arranged in multiple columns along the plurality of the first Y-axes Y1, and the second transparent regions 220b are arranged in multiple columns along the plurality of the second Y-axes Y2.

The plurality of the first transparent regions 220a are respectively disposed at a plurality of intersection points of the plurality of the first X-axes X1 and the plurality of the first Y-axes Y1, and the plurality of the second transparent regions 220b are respectively disposed at a plurality of intersection points of the plurality of the second X-axes X2 and the plurality of the second Y-axes Y2. That is to say, two adjacent first transparent region 220a and second transparent region 220b are offset from each other in the second direction D2.

Moreover, a distance (namely, S1) between two intersection points, at which two adjacent transparent regions 220b being arranged on the same Y-axis (e.g., the second Y-axis Y2) are respectively positioned, is less than or equal to the maximum length L1 of the sensor region, and a distance (namely, H1) between two adjacent Y-axes (namely, the first Y-axis Y1 and the second Y-axis Y2) is less than or equal to the maximum width W1 of the sensor region. In this way, it can prevent the issue of the great reduction of the amount of incident light of the sensor region 210 due to the change of the relative position of the absorbing element 22a and the image capture element 21.

Figure 4:
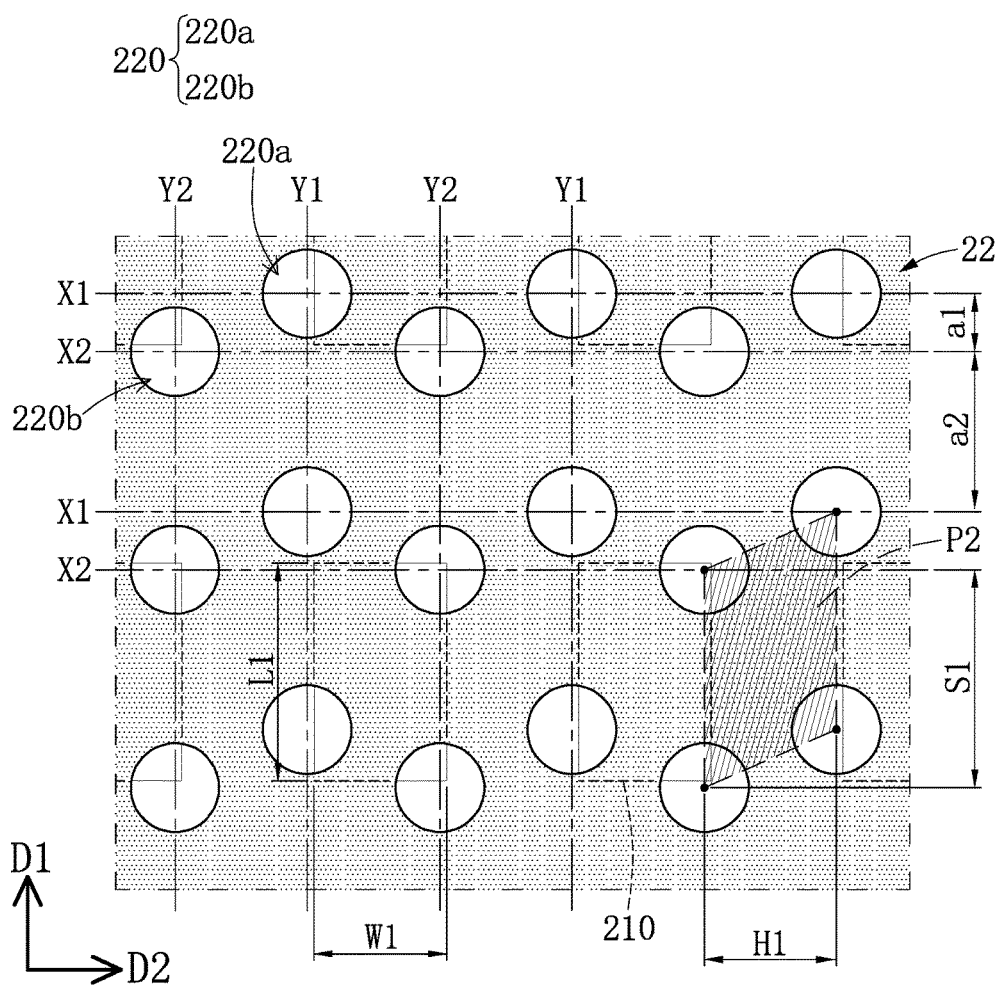
FIG. 4 is a partial top view of a luminous flux adjusting device and an image capture device of an image capture apparatus according to another embodiment of the present disclosure.

Continuing referring to FIG. 4, FIG. 4 is a partial top view of a luminous flux adjusting device and an image capture device of an image capture apparatus according to another embodiment of the present disclosure. The same reference numbers are given to the same or similar elements of this embodiment and the embodiments of FIG. 3A to FIG. 3C.

In this exemplary embodiment, each basic pattern includes a plurality of transparent regions arranged according to a geometric shape P2. The geometric shape P2 in this embodiment is a quadrilateral, and each of the basic patterns includes four transparent regions 220 respectively located at four vertexes of the quadrilateral. The aforementioned quadrilateral can be a square, a rectangle, a parallelogram or a rhombus.

In this embodiment, the quadrilateral is a parallelogram, and one of the sides of the quadrilateral is parallel to the first direction D1. In addition, a length S1 of the side would be less than or equal to the maximum length L1 of the sensor region 210 and a height H1 vertical to the side of the quadrilateral would less than or equal to the maximum width W1 of the sensor region 210. In this way, it can achieve the purpose of the present disclosure by preventing the amount of incident light of the sensor region 210 from being affected by the change of the relative position of the absorbing element 22a and the image capture device 21.

Further, a plurality of Y-axes are divided into a plurality of first Y-axes Y1 and a plurality of second Y-axes Y2, and the plurality of the first Y-axes Y1 and the plurality of the second Y-axes Y2 are alternately arranged. Moreover, a plurality of X-axes are also divided into a plurality of first X-axes X1 and a plurality of second X-axes X2, and the plurality of the first X-axes X1 and the plurality of the second X-axes X2 are alternately arranged.

The plurality of the transparent regions 220 are divided into a plurality of first transparent regions 220a and a plurality of second transparent regions 220b. The plurality of the first transparent regions 220a are respectively disposed at a plurality of intersection points of the plurality of the first X-axes X1 and the plurality of the first Y-axes Y1, and the plurality of the second transparent regions 220b are respectively disposed at a plurality of intersection points of the plurality of the second X-axes X2 and the plurality of the second Y-axes Y2. That is to say, two adjacent first transparent region 220a and second transparent region 220b are offset from each other at the second direction D2.

However, the difference between this embodiment and the former embodiment is that a first distance a1 between the first X-axis X1 and one of adjacent second X-axes X2 is different from a second distance a2 between the first X-axis X1 and the other adjacent second X-axis X2. That is to say, although the first distance a1 is different from the second distance a2, the purpose of the present disclosure can also be achieved as long as the distance (namely, the height H1 of the quadrilateral) between the two adjacent Y-axes (the first Y-axis Y1 and the second Y-axis Y2) is less than or equal to the maximum width W1 of the sensor region 210, and the distance (namely, the length S1 of one of the side of the quadrilateral) between the two adjacent X-axes is less than or equal to the maximum length L1 of the sensor region 210.

Figure 5:
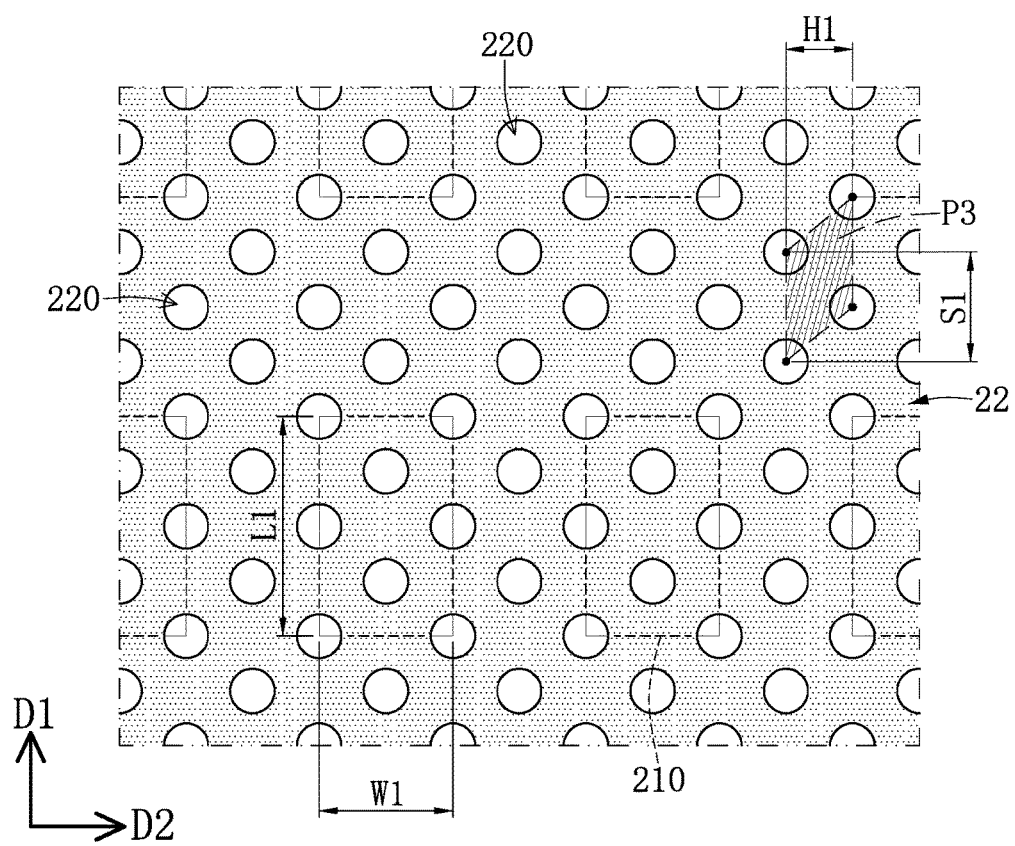
FIG. 5 is a partial top view of a luminous flux adjusting device and an image capture device of an image capture apparatus of according to further embodiment of the present disclosure.

FIG. 5 is a partial top view of a luminous flux adjusting device and an image capture device of an image capture apparatus according to another embodiment of the present disclosure.

In the embodiment of FIG. 5, an area of the transparent region 220 is less than the area of the transparent region 220 in FIG. 3 and FIG. 4. In addition, in this embodiment, the basic pattern includes four transparent regions 220 arranged according to another quadrilateral (a geometric shape P3), and the four transparent regions 220 are respectively located at vertexes of the quadrilateral.

The quadrilateral has a side parallel to the first direction D1 and a height H1 vertical to the side. The length of the side and the maximum length of the sensor region 210 satisfy the following relation: n1×S1=L1, where n1 is a positive integer, S1 is the length of the side, and L1 is the maximum length of the sensor region 210. Moreover, the height of the quadrilateral and the maximum width of the sensor region 210 satisfy the following relation: n2×H1=W1, where n2 is a positive integer, H1 is the height of the quadrilateral, and W1 is the maximum width of the sensor region 210.

In this exemplary embodiment, n1 and n2 equal 2. That is to say, the length of the side S1 of the quadrilateral is 0.5 times the maximum length L1 of the sensor region 210, and the height H1 of the quadrilateral is 0.5 times the maximum width W1 of the sensor region 210.

In this exemplary embodiment, no matter how the relative position of the absorbing element 22a and the image capture device 21 changes, the sums of the areas where any of the sensor regions 210 overlaps the plurality of the transparent regions 220 in the vertical direction will be substantially 4 times the area of one transparent region 210. Therefore, by preventing the amount of incident light of the sensor region 210 from being affected by the change of the relative position of the absorbing element 22a and the image capture device 21, the purpose of the creation can be achieved. In other embodiments, n1 and n2 is not necessary to be the same.

Figure 6:
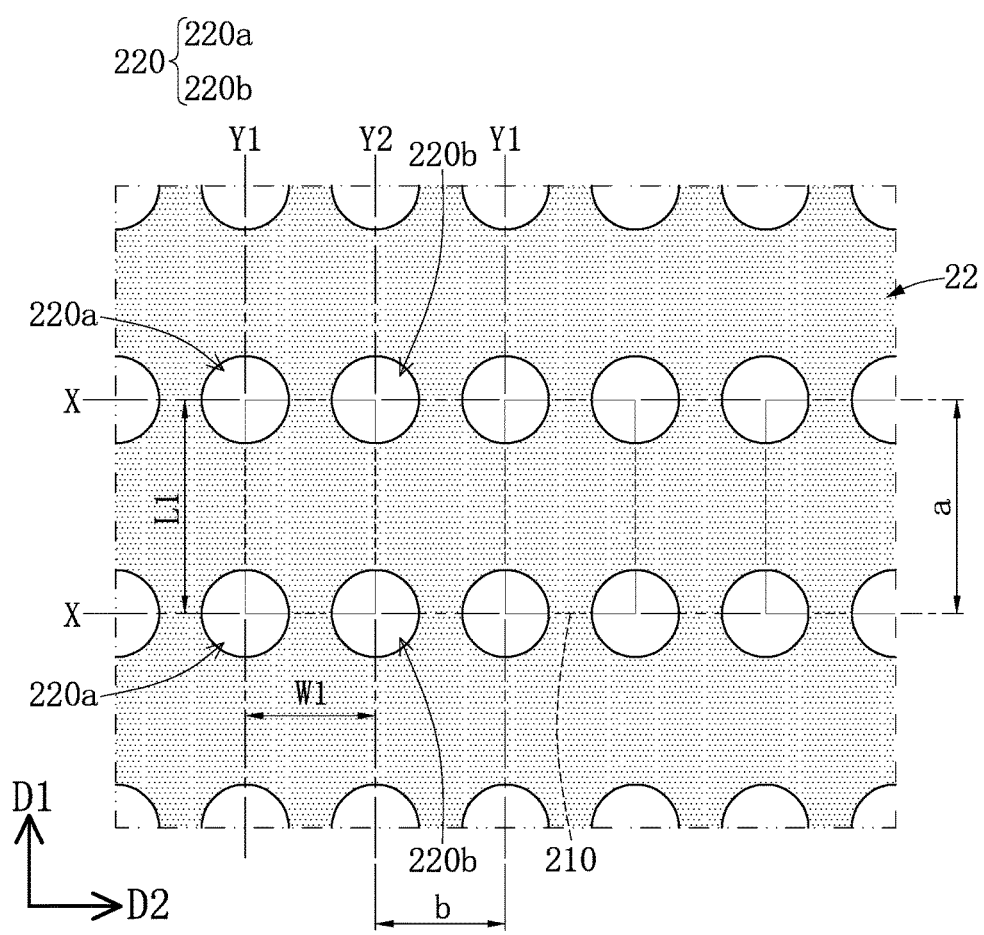
FIG. 6 is a partial top view of a luminous flux adjusting device and an image capture device of an image capture apparatus of according to yet another embodiment of the present disclosure.

Referring to FIG. 6, a partial top view of a luminous flux adjusting device and an image capture device of an image capture apparatus according to yet another exemplary embodiment of the present disclosure is shown.

In this embodiment, a transparent pattern includes a plurality of basic patterns repeatedly arranged, each of the basic patterns includes four transparent regions 220 arranged according to a quadrilateral (not shown in the drawings). In this embodiment, the quadrilateral is a rectangle.

That is to say, the transparent pattern includes a plurality of the transparent regions arranged along a plurality of X-axes and a plurality of Y-axes. The plurality of the transparent regions are divided into a plurality of first transparent regions 220a and a plurality of second regions 220b, the plurality of the Y-axes are divided into a plurality of first Y-axes Y1 and a plurality of second Y-axes Y2, and the plurality of the first Y-axes Y1 and the plurality of the second Y-axes Y2 are arranged alternately. The plurality of the first transparent regions 220a are arranged in multiple columns along the plurality of the first Y-axes Y1, the plurality of the second transparent regions 220b are arranged in multiple columns along the plurality of the second Y-axes Y2, and the two adjacent first transparent regions 220a and the second transparent regions 220b are aligned with each other along the same X-axis.

In this exemplary embodiment, a distance "b" between two adjacent first Y-axes Y1 and second Y-axes Y2 is less than or equal to the maximum length L1 of the sensor region 210, and a distance "a" between two adjacent X-axes is less than or equal to the maximum width W1 of the sensor region 210. Therefore, the issue of the great reduction of the amount of incident light of the sensor region 210 due to the change of the relative position of the absorbing element 22a and the image capture device 21 can be prevented.

Figure 7:
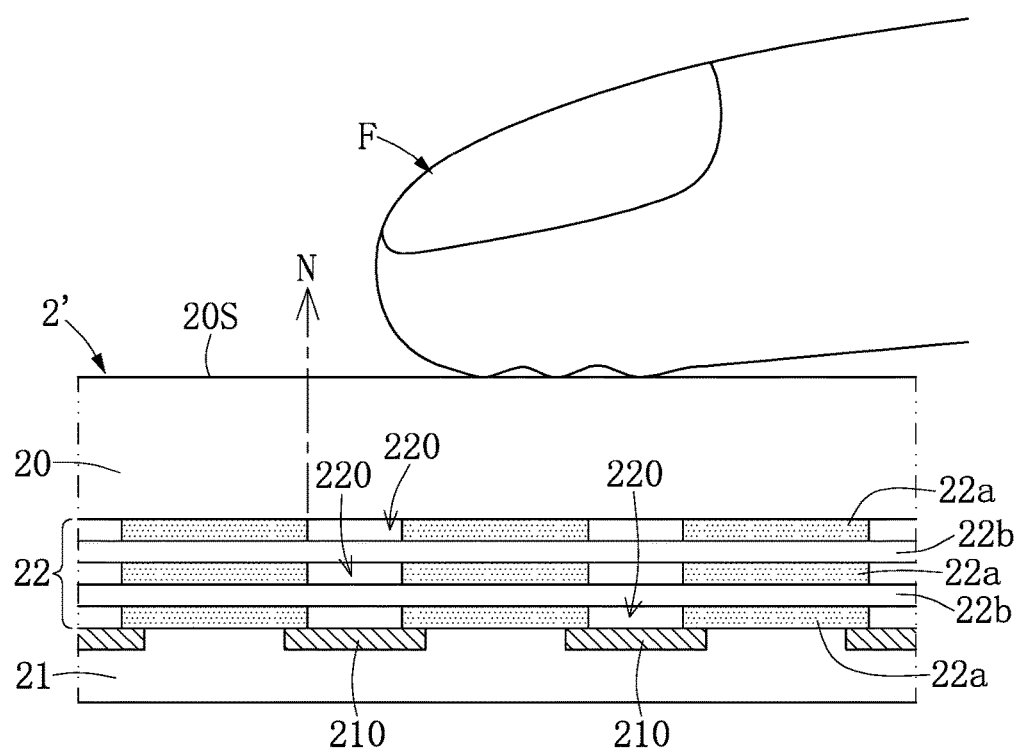
FIG. 7 is a partial sectional view of an image capture apparatus according to another embodiment of the present disclosure.

FIG. 7 is a partial sectional view of an image capture apparatus according to another embodiment of the present disclosure. In this embodiment, the luminous flux adjusting device 22 includes the plurality of the absorbing elements 22a and a plurality of transparent elements 22b alternately stacked. Each of the absorbing elements 22a has a transparent pattern and the transparent pattern includes the plurality of the transparent regions 220.

In this embodiment, a material of the absorbing element 22a is a light absorbing material, e.g., an ink layer. In addition, all the absorbing elements 22a have similar transparent patterns and the transparent patterns may be selected from any of the embodiments from FIG. 3A to FIG. 6.

In FIG. 7, the transparent patterns of the plurality of the absorbing elements 22a match and correspond to each other to form a plurality of light tunnels. That is to say, the transparent regions 220 of the transparent patterns would be aligned with each other in a normal direction N of the surface 20S, to form the light tunnels allowing the signal light beam L' to enter the sensor regions 210. In other words, the signal light beam L' reflected by the surface 20S may pass through the light tunnels, entering the plurality of the sensor regions 210 of the image capture device 21.

Each light tunnel has a first end close to the transparent cover 20 and a second end close to the image capture device 21, and the aperture of the first end is larger than, smaller than or equal to the aperture of the second end. In this embodiment, the aperture of the first end and the aperture of the second end of the light tunnel is the same.

Figure 8:
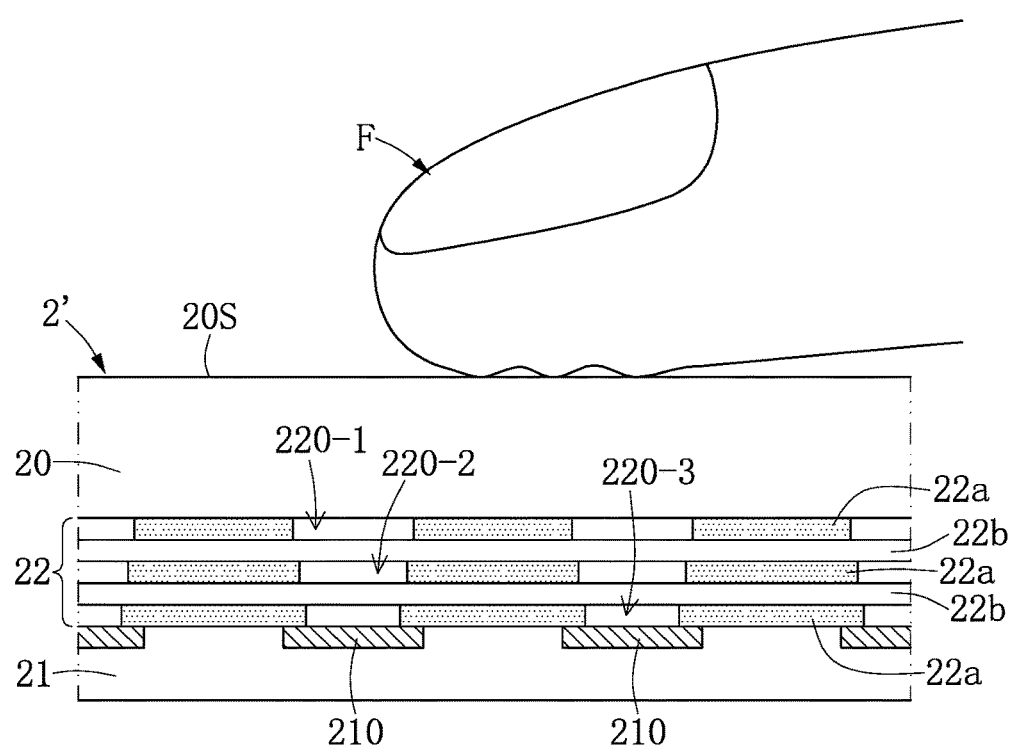
FIG. 8 is a partial sectional view of an image capture apparatus according to another embodiment of the present disclosure.

FIG. 8 is a partial sectional view of an image capture apparatus according to another exemplary embodiment of the present disclosure. Similar to the embodiment of FIG. 7, the transparent patterns of the plurality of the absorbing elements 22a in FIG. 8 match and correspond to each other to form a plurality of light tunnels. However, in the light tunnel of the instant embodiment, the aperture of a first end is larger than the aperture of the second end.

Specifically, apertures of a plurality of transparent regions 220-1, 220-2, and 220-3 forming the same light tunnel will gradually decrease in a direction away from the transparent cover 20. Accordingly, each aperture of the transparent regions 220-1 of the absorbing element 22a closest to the transparent cover 20 would be larger than each aperture of the transparent regions 220-3 of the shielding member 22a closest to the image capture device 21.

Figure 9:
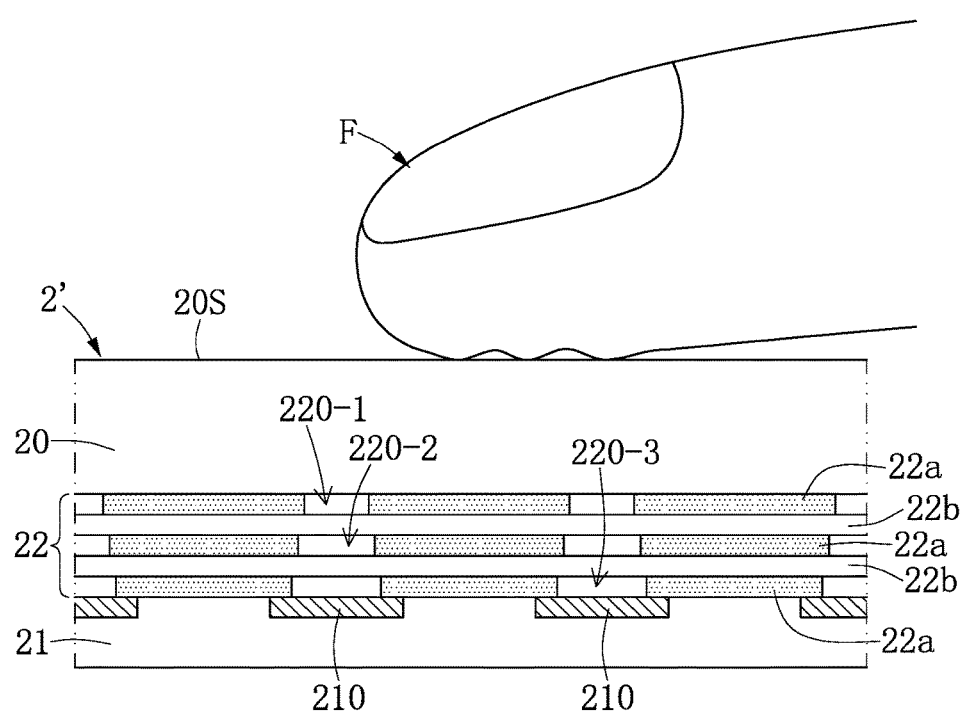
FIG. 9 is a partial sectional view of an image capture apparatus according to another embodiment of the present disclosure.

FIG. 9 is a partial sectional view of an image capture apparatus according to another exemplary embodiment of the present disclosure. The transparent patterns of the plurality of the absorbing elements 22a match and correspond to each other to from a plurality of light tunnels. In this embodiment, in the light tunnel, the aperture of a first end is smaller than the aperture of a second end.

Specifically, apertures of the plurality of the transparent regions 220-1, 220-2, and 220-3 forming the same light tunnel will gradually increase in a direction away from the transparent cover 20. Accordingly, each aperture of the transparent regions 220-1 of the absorbing element 22a closest to the transparent cover 20 would be smaller than each aperture of the transparent regions 220-3 of the absorbing element 22a closest to the image capture device 21.

Figure 10:
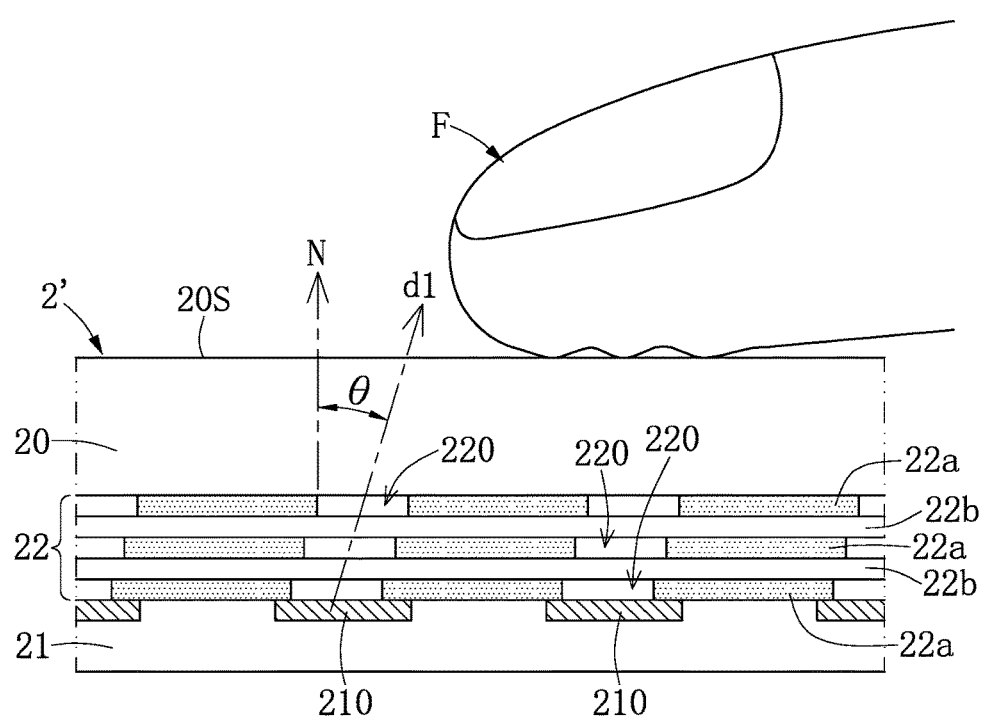
FIG. 10 is a partial sectional view of an image capture apparatus according to another embodiment of the present disclosure.

FIG. 10 is a partial sectional view of an image capture apparatus according to another exemplary embodiment of the present disclosure. In this embodiment, the transparent patterns of the plurality of the absorbing elements 22a partially overlap in the normal direction N vertical to the surface 20S, to form a plurality of inclined light tunnels.

Specifically, in the plurality of the absorbing elements 22a, a line connecting the centers of a group of the transparent regions 220 forming the same light tunnel is determined as an inclination direction d1 of the light tunnel. The inclination direction d1 would form an included angle θ with the normal direction N of the surface 20S of the transparent cover 20, and the included angle θ is between 0 and 60 degrees. The inclination direction d1 of the light tunnel can correspond to a projection direction of the signal light beam L' to increase an amount of the signal light beam L' received by the image capture device 21.

Figure 11:
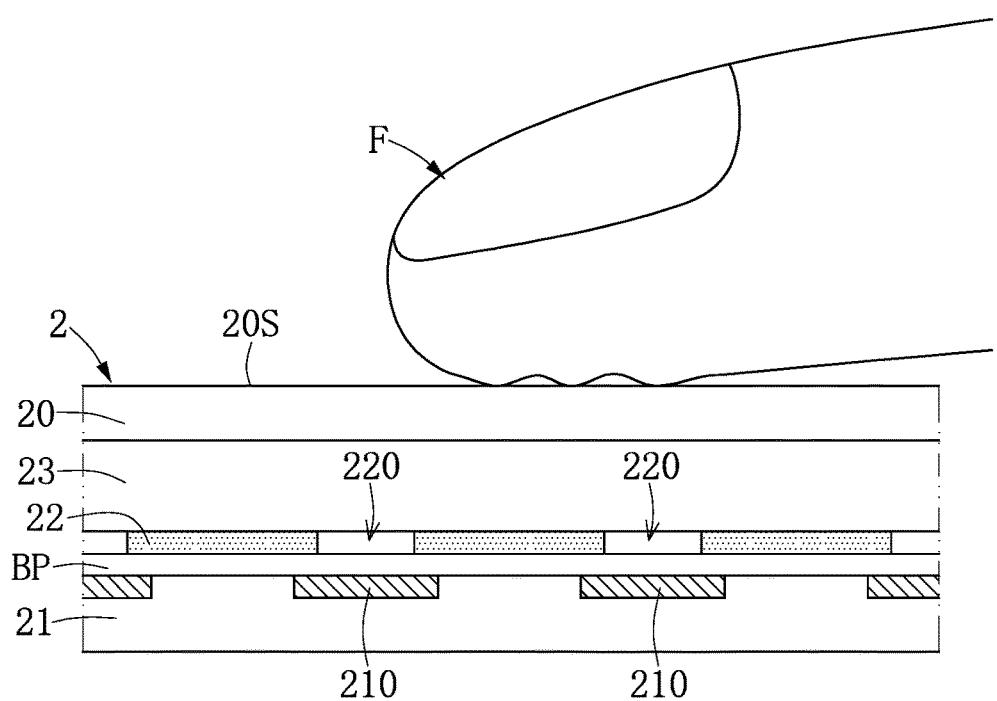
FIG. 11 is a partial sectional view of an image capture apparatus according to another embodiment of the present disclosure.

FIG. 11 is a partial sectional view of an image capture apparatus according to another exemplary embodiment of the present disclosure. In this embodiment, the image capture apparatus 2 further includes a display panel 23 and a band pass filter layer BP.

The display panel 23 may be disposed between the luminous flux adjusting device 22 and the transparent cover 20. The display panel 23 may include a plurality of organic light emitting diode layers. In another embodiment, the display panel 23 includes at least one organic light emitting diode layer and a touch screen layer. It should be stated that the display panel 23 may be disposed in image capture apparatuses 2 and 2' of any of the embodiments of the present disclosure. In addition, the band pass filter layer BP is located between the display panel 23 and the image capture device 21. Further, the band pass filter layer BP is located between the luminous flux adjusting device 22 and the sensor region 210 of the image capture device 21, and is used to filter out stray light other than the signal light beam L'. In this way, the band pass filter layer BP can prevent ambient light or a light beam generated by the display layer 23 from entering the image capture device 21 to cause signal interference. Accordingly, recognition accuracy of the image capture apparatus 2 can be improved by disposing the band pass filter layer BP.

For instance, when the signal light beam L' is infrared light, the band pass filter layer BP has a transmittance of the signal light beam L' at least greater than 80%, and a transmittance of visible light and UV light less than 20%. Further, the band pass filter layer BP can be an infrared band pass filter layer, allowing light beams having a wavelength that ranges from 800 nm to 900 nm to pass, and filtering out light beams having a wavelength that ranges out of 800 nm to 900 nm. In other embodiments, the band pass filter layer BP may allow light beams having a wavelength that ranges from 840 nm to 860 nm to pass, or having a wavelength that ranges from 890 nm to 990 nm to pass.

In another exemplary embodiment, the band pass filter layer BP may be located between a display panel 30 and the luminous flux adjusting device 22. It should be stated that the band pass filter layer BP may be disposed in the image capture apparatuses 2 and 2' of any of the embodiments of the present disclosure. That is to say, the image capture apparatuses 2 and 2' can filter out the stray light by disposing the band pass filter layer BP therein whether they have the display panel 30 or not.

For instance, referring to FIG. 2, the image capture apparatus 2 in FIG. 2 may include the band pass filter layer BP disposed between the transparent cover 20 and the image capture device 21. When the band pass filter layer BP is an infrared band pass filter layer, only allowing the light beams having the wavelength that ranges from 800 nm to 900 nm to pass, the light beam L' generated by the luminous element Ls is infrared light and has the wavelength that ranges from 800 nm to 900 nm.

When the band pass filter layer BP allows the light beams having the wavelength that ranges from 840 nm to 860 nm or from 890 nm to 990 nm to pass, the light beam L' generated by the luminous element L' has the wavelength that ranges from 840 nm to 860 m, or from 890 nm to 990 nm, and the present disclosure does not limit. In summary, one of the beneficial effects of the present disclosure is that, the image capture apparatuses 2 and 2' provided by the present disclosure can prevent the great reduction of the amount of incident light due to the change of the relative position of the luminous flux adjusting device 22 and the image capture device 21 by a technical solution that "the absorbing element 22a has a transparent pattern formed by the plurality of the basic patterns arranged repeatedly".

It is assumed that, when the absorbing element 22a and the image capture device 21 are positioned accurately, each sensor region has an initial amount of incident light. After actual testing, by using the absorbing element 22a provided by the embodiments of the present disclosure, the amount of incident light of each sensor region 210 would not be lower than 80% of the initial amount of incident light no matter how the direction and the distance of the relative position of the absorbing element 22a and the image capture device 21 change. Accordingly, even if the luminous flux adjusting device 22 and the image capture device 21 are positioned inaccurately and thus deviated relatively during manufacturing the image capture apparatus of the embodiments of the present disclosure, the amount of incident light of the sensor region 210 would not be affected.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An image capture apparatus, comprising:
a transparent cover having a surface in contact with an environmental medium;
an image capture device, disposed at a side of the transparent cover opposite to the surface, wherein the image capture device includes a plurality of sensor regions, and each of the sensor regions has a maximum length in a first direction and a maximum width in a second direction; and
a luminous flux adjusting device, disposed between the transparent cover and the image capture device, wherein the luminous flux adjusting device includes at least one absorbing element defining a transparent pattern;
wherein, the transparent pattern includes a plurality of basic patterns which are repeatedly arranged, each of the basic patterns includes a plurality of transparent regions which are arranged according to a geometric shape, the geometric shape has a side parallel to the first direction, and a length of the side is less than or equal to the maximum length of the sensor region, and the geometric shape has a height vertical to the side and less than or equal to the maximum width of the sensor region.

2. The image capture apparatus according to claim 1, wherein the geometric shape is a quadrilateral, each of the basic patterns includes four of the transparent regions and the four transparent regions are respectively located at vertexes of the quadrilateral.

3. The image capture apparatus according to claim 2, wherein the quadrilateral is a square, a rectangle, a parallelogram or a rhombus.

4. The image capture apparatus according to claim 1, wherein the geometric shape is a triangle, each of the basic patterns includes three of the transparent regions, and the three transparent regions are respectively located at vertexes of the triangle.

5. The image capture apparatus according to claim 4, wherein the triangle is an isosceles triangle, a right triangle, or an equilateral triangle.

6. The image capture apparatus according to claim 4, wherein six of the triangles are arranged to form a hexagon, at least one of the transparent regions is located at a center position of the hexagon, and at least six of the transparent regions are respectively located at six vertexes of the hexagon.

7. The image capture apparatus according to claim 1, wherein the length of the side and the maximum length of the sensor region satisfy the following relation: n1×S1=L1, where n1 is a positive integer, S1 is the length of the side, and L1 is the maximum length of the sensor region.

8. The image capture apparatus according to claim 1, wherein the height of the side and the maximum width of the sensor region satisfy the following relation: n2×H1=W1, where n2 is a positive integer, H1 is the height of the side, and W1 is the maximum width of the sensor region.

9. The image capture apparatus according to claim 1, wherein the luminous flux adjusting device further includes an another absorbing element, and a transparent pattern of the another absorbing element and the transparent pattern of the absorbing element match and correspond to each other, to form a plurality of light tunnels.

10. The image capture apparatus according to claim 1, wherein the luminous flux adjusting device further includes an another absorbing element, and a transparent pattern of the another absorbing element and the transparent pattern of the absorbing element partially overlap in a normal direction vertical to the surface, to form a plurality of inclined light tunnels.

11. The image capture apparatus according to claim 1, further comprising: a display panel disposed between the transparent cover and the luminous flux adjusting device, the display panel at least including an organic light emitting diode layer.

12. The image capture apparatus according to claim 1, further comprising: a band pass filter layer disposed between the luminous flux adjusting device and the image capture device.

13. An image capture apparatus, comprising:
a transparent cover having a surface in contact with an environmental medium;
an image capture device disposed at a side of the transparent cover opposite to the surface, wherein the image capture device includes a plurality of sensor regions, each of the sensor regions has a maximum length in a first direction and a maximum width in a second direction; and
a luminous flux adjusting device, disposed between the transparent cover and the image capture device, wherein the luminous flux adjusting device includes at least one absorbing element having a transparent pattern;
wherein, the transparent pattern includes a plurality of basic patterns which are repeatedly arranged, each of the basic patterns includes a plurality of transparent regions which are arranged according to a hexagon shape, one of the transparent regions is located at a center position of the hexagon, and the other transparent regions are respectively located at six vertexes of the hexagon;
wherein a distance between the center position and any of the vertexes of the hexagon is less than or equal to the maximum length of the sensor region, and a distance between the center and one of the sides of the hexagon is less than or equal to the maximum width of the sensor region.

14. The image capture apparatus according to claim 13, wherein the hexagon is a regular hexagon, and the distance between the center position and any of the vertexes is less than the maximum width of the sensor region.

15. The image capture apparatus according to claim 13, further comprising: a display panel disposed between the transparent cover and the luminous flux adjusting device, the display panel at least including an organic light emitting diode layer.

16. The image capture apparatus according to claim 13, further comprising: a band pass filter layer disposed between the luminous flux adjusting device and the image capture device.

17. An image capture apparatus, comprising:
a transparent cover having a surface in contact with an environmental medium;
an image capture device disposed at a side of the transparent cover opposite to the surface, wherein the image capture device includes a plurality of sensor regions, each of which has a maximum length in a first direction and a maximum width in a second direction; and a luminous flux adjusting device disposed between the transparent cover and the image capture device, wherein the luminous flux adjusting device includes at least one absorbing element having a transparent pattern;
wherein the transparent pattern includes a plurality of transparent regions which are arranged along a plurality of X-axes and a plurality of Y-axes, the plurality of the X-axes and the plurality of the Y-axes intersect each other at a plurality of intersection points, the plurality of the transparent regions are respectively located at at least a part of the plurality of the intersection points, a distance between two intersection points, at which two adjacent transparent regions being arranged on the same Y-axis are respectively positioned, is less than or equal to the maximum length of the sensor region, and a distance between two adjacent Y-axes is less than or equal to the maximum width of the sensor region.

18. The image capture apparatus according to claim 17, wherein the plurality of the transparent regions are divided into a plurality of first transparent regions and a plurality of second transparent regions, the plurality of the Y-axes are divided into a plurality of first Y-axes and a plurality of second Y-axes, the plurality of the first Y-axes and the plurality of the second Y-axes are alternately arranged, the plurality of the first transparent regions are arranged in multiple columns along the plurality of the first Y-axes, the plurality of the second transparent regions are arranged in multiple columns along the plurality of the second Y-axes, and two adjacent first transparent region and second transparent region are offset from each other.

19. The image capture apparatus according to claim 18, wherein the plurality of the X-axes are divided into a plurality of first X-axes and a plurality of second X-axes, the plurality of the first X-axes and the plurality of the second X-axes are arranged alternately, the plurality of the first transparent regions are respectively disposed at the plurality of the intersection points of the plurality of the first X-axes and the plurality of the first Y-axes, the plurality of the second transparent regions are respectively disposed at the plurality of the intersection points of the plurality of the second X-axes and the plurality of the second Y-axes, and the distances between any two adjacent first X-axis and second X-axis are the same.

20. The image capture apparatus according to claim 18, wherein the plurality of the X-axes are divided into a plurality of first X-axes and a plurality of second X-axes, the plurality of the first X-axes and the plurality of the second X-axes are arranged alternately, the plurality of the first transparent regions are respectively disposed at the plurality of the intersection points of the plurality of the first X-axes and the plurality of the first Y-axes, the plurality of the second transparent regions are respectively disposed at the plurality of the intersection points of the plurality of the second X-axes and the plurality of the Y-axes, and a distance between the first X-axis and one of the adjacent second X-axes is different from a distance between the first X-axis and the another adjacent second X-axis.

21. The image capture apparatus according to claim 17, wherein the plurality of the transparent regions are divided into a plurality of first transparent regions and a plurality of second transparent regions, the plurality of the Y-axes are divided into a plurality of first Y-axes and a plurality of second Y-axes, the plurality of the first Y-axes and the plurality of the second Y-axes are alternately arranged, the plurality of the first transparent regions are arranged in multiple columns along the plurality of the first Y-axes, the plurality of the second transparent regions are arranged in multiple columns along the plurality of the second Y-axes, and two adjacent first transparent region and the second transparent region are aligned with each other along the same X-axis.

22. The image capture apparatus according to claim 17, further comprising: a display panel located between the transparent cover and the luminous flux adjusting device, the display panel at least including an organic light emitting diode layer.

23. The image capture apparatus according to claim 17, further comprising: a band pass filter layer located between the luminous flux adjusting device and the image capture device.

24. The image capture apparatus according to claim 23, further comprising: a luminous element for providing a light beam projected to the transparent cover, wherein the band pass filter layer has a transmittance of the light beam greater than 80%.

* * * * *